United States Patent
Masuda et al.

(10) Patent No.: US 12,451,297 B2
(45) Date of Patent: Oct. 21, 2025

(54) LITHIUM-ION CAPACITOR

(71) Applicant: Panasonic Intellectual Property Management Co., Ltd., Osaka (JP)

(72) Inventors: Shohei Masuda, Kyoto (JP); Kenichi Nagamitsu, Kyoto (JP); Nao Matsumura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 116 days.

(21) Appl. No.: 18/549,151

(22) PCT Filed: Mar. 17, 2022

(86) PCT No.: PCT/JP2022/012120
§ 371 (c)(1),
(2) Date: Sep. 5, 2023

(87) PCT Pub. No.: WO2022/209928
PCT Pub. Date: Oct. 6, 2022

(65) Prior Publication Data
US 2024/0128030 A1   Apr. 18, 2024

(30) Foreign Application Priority Data
Mar. 29, 2021   (JP) .................................. 2021-056090

(51) Int. Cl.
*H01G 11/06* (2013.01)
*H01G 11/28* (2013.01)
(Continued)

(52) U.S. Cl.
CPC ............ *H01G 11/06* (2013.01); *H01G 11/28* (2013.01); *H01G 11/42* (2013.01); *H01G 11/62* (2013.01)

(58) Field of Classification Search
None
See application file for complete search history.

(56) References Cited

U.S. PATENT DOCUMENTS

| | | | |
|---|---|---|---|
| 2018/0269486 A1* | 9/2018 | Umetsu | H01G 11/64 |
| 2023/0178850 A1* | 6/2023 | Horikawa | H01M 50/443 |
| | | | 429/246 |
| 2024/0128030 A1* | 4/2024 | Masuda | H01G 11/26 |

FOREIGN PATENT DOCUMENTS

| | | | |
|---|---|---|---|
| JP | 2017139324 A | * | 8/2017 |
| JP | 2017228710 A | * | 12/2017 |

(Continued)

OTHER PUBLICATIONS

International Search Report of PCT application No. PCT/JP2022/012120 dated Jun. 14, 2022.

*Primary Examiner* — Dion R. Ferguson
(74) *Attorney, Agent, or Firm* — Rimon P.C.

(57) ABSTRACT

In a lithium-ion capacitor, the positive electrode includes a positive current collector and a positive electrode mixture layer. The positive electrode mixture layer contains a positive electrode active material. An electrostatic capacity of the positive current collector is less than or equal to 20 μF/cm². The negative electrode includes a negative current collector and a negative electrode mixture layer. The negative electrode mixture layer contains a negative electrode active material. The electrolyte contains a first lithium salt and a second lithium salt. The first lithium salt is a lithium salt of a fluorine-containing inorganic acid, and the second lithium salt is a lithium salt of a fluorine-containing acid imide. A proportion of a molar concentration of the first lithium salt in a total molar concentration of the first lithium salt and the second lithium salt in the electrolyte is more than 0% and less than or equal to 35%.

9 Claims, 2 Drawing Sheets

(51) Int. Cl.
*H01G 11/42* (2013.01)
*H01G 11/62* (2013.01)

(56) References Cited

FOREIGN PATENT DOCUMENTS

| | | | | |
|---|---|---|---|---|
| JP | 2018-061039 | | 4/2018 | |
| JP | 2018056180 A | * | 4/2018 | |
| JP | 2019-024040 | | 2/2019 | |
| WO | WO-2022201464 A1 | * | 9/2022 | .......... H01M 10/052 |
| WO | WO-2022209928 A1 | * | 10/2022 | ............. H01G 11/06 |

* cited by examiner

FIG. 1

LITHIUM-ION CAPACITOR

TECHNICAL FIELD

The present invention relates to a lithium-ion capacitor.

BACKGROUND

Lithium-ion capacitors in which the electricity storage principles of a lithium-ion secondary battery and an electric double layer capacitor are combined have attracted attention. Such lithium-ion capacitors typically use a polarizable electrode for a positive electrode and a non-polarizable electrode for a negative electrode. The lithium-ion capacitors are expected to have both the high energy density of a lithium-ion secondary battery and the high output characteristic of an electric double layer capacitor.

Unexamined Japanese Patent Publication No. 2019-24040 proposes a nonaqueous lithium-type electricity storage element including a laminate film, and a positive electrode, a negative electrode, a separator, and a nonaqueous electrolytic solution hermetically housed in the laminate film, wherein the positive electrode includes a positive electrode active material layer formed of a material containing activated carbon on a positive current collector, the negative electrode includes a negative electrode active material layer capable of occluding and releasing lithium ions on a negative current collector, and $1.80 \leq K/M < 4.00$ is satisfied where $K(N/mm)$ is a spring constant in a thickness direction of the nonaqueous lithium-type electricity storage element and $M(g)$ is a mass of the nonaqueous lithium-type electricity storage element. It is described that both the positive current collector and the negative current collector are plain foils. It is described that for the nonaqueous electrolytic solution, as a lithium salt, for example, $(LiN(SO_2F)_2)$, $LIN(SO_2CF_3)_2$, $LIN(SO_2C_2F_5)_2$, $LIN(SO_2CF_3)(SO_2C_2F_5)$, $LIN(SO_2CF_3)(SO_2C_2F_4H)$, $LiC(SO_2F)_3$, $LiC(SO_2CF_3)_3$, $LiC(SO_2C_2F_5)_3$, $LiCF_3SO_3$, $LiC_4F_9SO_3$, $LiPF_6$, $LiBF_4$, or the like can be used alone, or two or more thereof may be used in combination, and $LiPF_6$ and/or $LiN(SO_2F)_2$ is preferably included because high conductivity can be exhibited.

SUMMARY

A positive current collector of a lithium-ion capacitor that is typically used is a metal porous body such as a perforated foil or an etching foil. When a plane foil is used as in Unexamined Japanese Patent Publication No. 2019-24040, the positive electrode active material layer easily peels off, and deterioration of the positive electrode is remarkable. In addition, when the electricity storage element is used at a high temperature of more than or equal to 80° C., gas generation may become remarkable. On the other hand, at a low temperature of less than or equal to 0° C., the initial resistance may increase, and sufficient high output characteristics is not obtained in some cases.

One aspect of the present invention relates to a lithium-ion capacitor including a positive electrode, a negative electrode, and an electrolyte having lithium ion conductivity. The positive electrode includes a positive current collector and a positive electrode mixture layer supported on the positive current collector. The positive electrode mixture layer contains a positive electrode active material reversibly doped with an anion. An electrostatic capacity of the positive current collector is less than or equal to 20 $\mu F/cm^2$. The negative electrode includes a negative current collector and a negative electrode mixture layer supported on the negative current collector. The negative electrode mixture layer contains a negative electrode active material reversibly doped with a lithium ion. The electrolyte contains a first lithium salt and a second lithium salt. The first lithium salt is a lithium salt of a fluorine-containing inorganic acid, and the second lithium salt is a lithium salt of a fluorine-containing acid imide. A proportion of a molar concentration of the first lithium salt in a total molar concentration of the first lithium salt and the second lithium salt in the electrolyte is more than 0% and less than or equal to 35%.

The present disclosure can provide a lithium-ion capacitor that is stable even at a high temperature, in which deterioration of a positive electrode hardly proceeds, and in which resistance hardly increases even at a low temperature.

DESCRIPTION OF EMBODIMENT

A lithium-ion capacitor according to the present disclosure includes a positive electrode, a negative electrode, and an electrolyte having lithium ion conductivity. The positive electrode and the negative electrode typically constitute a capacitor element together with a separator disposed therebetween. The capacitor element is formed as a columnar wound body by winding a positive electrode having a band shape and a negative electrode having a band shape with a separator disposed therebetween, for example. The capacitor element may also be formed as a stacked body in which a positive electrode having a plate shape and a negative electrode having a plate shape are stacked with a separator disposed therebetween.

Hereinafter, each component of the lithium-ion capacitor according to the exemplary embodiment of the present invention will be described in detail.

[Positive Electrode]

The positive electrode mixture layer contains a positive electrode active material reversibly doped with an anion. When an anion is adsorbed to the positive electrode active material, an electric double layer forms to develop a capacitance. The doping of the anion into the positive electrode active material is a concept that includes at least an adsorption phenomenon of the anion to the positive electrode active material and may include occlusion of the anion by the positive electrode active material and chemical interaction between the positive electrode active material and the anion.

The positive electrode mixture layer contains a positive electrode active material as an essential component, and contains a conductive agent, a binding agent, and the like as optional components. Examples of the conductive agent include carbon black and carbon fiber. Examples of the binding agent include a fluorine resin, an acrylic resin, a rubber material, and a cellulose derivative. The content of the binding agent contained in the positive electrode mixture layer may range, for example, from 2 mass % to 10 mass %, inclusive, or may range from 2 mass % to 8 mass %, inclusive.

As the positive electrode active material, a carbon material is used. The carbon material is preferably porous, and particularly preferably activated carbon. Examples of the raw material of activated carbon include wood, coconut shell, coal, pitch, and phenol resin. The activated carbon may be activated carbon that has been subjected to activation treatment. The average particle size of the activated carbon is not particularly limited, and is, for example, less than or equal to 20 µm, and may range from 3 µm to 15 µm, inclusive. The average particle size refers to a median diameter in a volume-based particle size distribution, which may be measured by, for example, a laser diffraction particle size distribution analyzer.

The activated carbon desirably accounts for more than or equal to 50 mass %, further, more than or equal to 80 mass %, and further, more than or equal to 95 mass % of the positive electrode active material. The activated carbon desirably accounts for more than or equal to 40 mass %, further, more than or equal to 70 mass %, and further, more than or equal to 90 mass % of the positive electrode mixture layer.

The positive electrode mixture layer is formed by, for example, mixing the positive electrode active material, the conductive agent, the binding agent, and the like with a dispersion medium to prepare a positive electrode mixture slurry, applying the positive electrode mixture slurry to the positive current collector, and thereafter drying the positive electrode mixture slurry. A sheet-shaped metallic material is used as the positive current collector.

The thickness of the positive electrode mixture layer ranges, for example, from 10 µm to 300 µm, inclusive, and it may range from 30 µm to 70 µm, inclusive, or may range from 40 µm to 60 µm, inclusive, per surface of the positive current collector. As the positive electrode mixture layer is thicker, the positive electrode mixture layer is more likely to be peeled off, but by inhibiting deterioration of the positive current collector, a relatively thick positive electrode mixture layer can be formed.

The positive current collector may be a metal foil. Typically, a metal porous body such as a perforated foil or an etching foil is used as a positive current collector of a lithium-ion capacitor, but the electrostatic capacity of the positive current collector of the lithium-ion capacitor according to the present disclosure may be less than or equal to 20 µF/cm$^2$. That is, the positive current collector does not have to be a perforated foil or an etching foil. The positive current collector may be a plain foil. The plain foil refers to a metal foil that does not have a plurality of holes and whose surface is not roughened by etching or the like. The electrostatic capacity of the positive current collector may be less than or equal to 4 µF/cm$^2$. The thickness of the positive current collector ranges, for example, from 5 µm to 50 µm, inclusive, and may be less than or equal to 30 µm, less than or equal to 20 µm, or less than or equal to 15 µm. The plain foil has high mechanical strength and may be thinner than common perforated or etched foils. By using a thin plane foil, the positive electrode mixture layer can be formed to be thicker, and thus, the capacitance of the lithium-ion capacitor can be easily improved.

The electrostatic capacity X µF/cm$^2$ means an electrostatic capacity per unit area (1 cm$^2$) in a projection view of the main surface of the positive current collector when the positive current collector is orthographically projected to a projection plane in a state that the main surface of the positive current collector is disposed to be parallel to the projection plane. The electrostatic capacity X is a total electrostatic capacity (that is, X/2 per main surface) of the front main surface and the back main surface.

The electrostatic capacity of the metal foil is measured by the following method. First, a test piece of a metal foil (that is, a positive current collector) is prepared. The shape and size of the test piece are not particularly limited, but the test piece has a portion to be measured for measuring electrostatic capacity and an extended portion. The portion to be measured is a portion to be immersed in a measurement solution. The shape and size of the portion to be measured are not particularly limited, but a rectangular shape is desirable, and for example, the portion has dimensions of 10 mm×50 mm. The extended portion is a portion that is not to be immersed in the measurement solution. The extended portion may be a portion cut out integrally with the portion to be measured. Any shape and size of the extended portion may be employed. As the measurement solution, an aqueous solution obtained by dissolving 80 g of ammonium pentaborate in 1 L of water is used. An electrostatic capacity measurement device conforming to JIS C 5101-1 is used. The accuracy is ±2% of the measurement value, the measurement frequency is 120 Hz±5%, and the measurement voltage is less than or equal to 0.5 Vrms. For the measurement tank to contain the measurement solution, a glass tall beaker having a volume of 200 mL or 300 mL in accordance with JIS R 3503 is used. The temperature of the measurement solution is set to 30° C.±1° C., the portions to be measured of a pair of test pieces having the same shape and the same size are immersed in the measurement solution, and each extended portion is connected to an electrostatic capacity meter in accordance with JIS C 5101-1 to measure the electrostatic capacity. The direction of the test piece (portion to be measured) in the measurement solution is freely selected, but a separation distance between the pair of test pieces is set to be 5 mm±2 mm.

As the metal material constituting the metal foil serving as the positive current collector, aluminum or an aluminum alloy is used. The aluminum alloy is an alloy of aluminum and another metal. Another metal is not particularly limited, but copper, manganese, silicon, magnesium, zinc, nickel, and the like are used. The content of another element contained in the aluminum alloy is preferably less than or equal to 10 mass %, and more preferably less than or equal to 2 mass %.

[Electrolyte]

The electrolyte has lithium ion conductivity. The electrolyte contains, for example, a lithium salt and a solvent that dissolves the lithium salt. The positive electrode is repeatedly and reversibly doped and dedoped with the lithium salt anion. Lithium ions derived from the lithium salt reversibly repeat doping and dedoping to the negative electrode.

The lithium salt includes a first lithium salt and a second lithium salt. The first lithium salt is a lithium salt of a fluorine-containing inorganic acid, and the second lithium salt is a lithium salt of a fluorine-containing acid imide.

The first lithium salt may be, for example, at least one selected from the group consisting of $LiPF_6$, $LiBF_4$, $LiSbF_6$, and $LiAsF_6$. Of these, from the viewpoint of reducing direct current resistance (DCR), at least one selected from the group consisting of $LiPF_6$ and $LiBF_4$ is preferable. At least one selected from the group consisting of $LiPF_6$ and $LiBF_4$ may account for more than or equal to 80 mass % or more than or equal to 90 mass % of the first lithium salt.

The second lithium salt may be, for example, at least one selected from the group consisting of $LiN(FSO_2)_2$, $LiN(CF_3SO_2)_2$, $LiN(CF_3SO_2)(C_4F_9SO_2)$, and $LiN(C_2F_5SO_2)_2$. Of these, from the viewpoint of reducing the gas generation amount, at least one selected from the group consisting of $LiN(FSO_2)_2$ and $LiN(CF_3SO_2)_2$ is preferable, and $LiN(FSO_2)_2$ is particularly preferable. Hereinafter, $LiN(FSO_2)_2$ is also referred to as LiFSI.

The increase rate of the low-temperature DCR tends to be remarkably decreased by using LiFSI. It is considered that LiFSI hardly generates by-products and smoothly contributes to charge and discharge without damaging the surface of the positive electrode active material. LiFSI may account for more than or equal to 80 mass % or more than or equal to 90 mass % of the second lithium salt.

Here, the proportion of the molar concentration of the first lithium salt in the total molar concentration of the first lithium salt and the second lithium salt in the electrolyte (hereinafter, also referred to as a "proportion of the first lithium salt". The proportion of the first lithium salt is the "X" value described later.) is important to provide a lithium-ion capacitor that is stable even at a high temperature, in which deterioration of the positive electrode hardly proceeds, and in which resistance hardly increases even at a low temperature. The proportion of the molar concentration of the first lithium salt in the total molar concentration of the first lithium salt and the second lithium salt is controlled to be more than 0% and less than or equal to 35%. The proportion of the molar concentration of the first lithium salt may range from 10% to 30%, inclusive. In this case, for example, gas generation during float charging at more than or equal to 80° C. can be remarkably inhibited while direct current resistance (DCR) at a low temperature of −30° C. is maintained low. The float charging is a charging method of maintaining a constant voltage for a long period of time using an external DC power supply. Gas generation largely depends on the degree of side reaction between the positive current collector and the lithium salt, and is an index of the magnitude of deterioration of the positive electrode. As the gas generation is more remarkable, deterioration of the positive electrode is large, and the positive electrode mixture layer is likely to peel off.

In the lithium-ion capacitor according to the present disclosure, deterioration of the positive electrode can be inhibited at a high temperature of more than or equal to 80° C. while maintaining a low DCR at a low temperature in spite of using the positive current collector having a very small electrostatic capacity, because the proportions of the first lithium salt and the second lithium salt are appropriately controlled.

At the time of charging, since the positive electrode active material is doped with a large amount of anions, when the proportion of the first lithium salt is not appropriately controlled, interaction between the positive current collector and the anions tends to occur. In the first lithium salt which is a lithium salt of a fluorine-containing inorganic acid, a side reaction with aluminum becomes severe at a high temperature of more than or equal to 80° C., and the positive current collector deteriorates that accompanies gas generation. In particular, since the positive current collector having an electrostatic capacity exceeding 20 $\mu F/cm^2$ has a large surface area, side reactions become remarkable. Use of a lithium-ion capacitor in which float charging continues at a high temperature of, in particular, more than or equal to 80° C. (further, more than or equal to 85° C.) puts the lithium-ion capacitor in a considerably severe environment. When the proportion of the first lithium salt is not appropriately controlled, it is difficult to use a positive current collector having an electrostatic capacity of less than or equal to 20 $\mu F/cm^2$ in such a use environment.

Further, when the proportion of the first lithium salt is not appropriately controlled so that the proportion of the second lithium salt is excessively large, the DCR at a low temperature becomes very large. In particular, in a positive current collector having an electrostatic capacity of less than or equal to 20 $\mu F/cm^2$, a contact area with the positive current collector is limited to a small area, and thus, increase in DCR is remarkable. That is, when the proportion of the first lithium salt is not appropriately controlled, it is difficult to use a positive current collector having an electrostatic capacity of less than or equal to 20 $\mu F/cm^2$ from the viewpoint of DCR.

On the other hand, in the case of a lithium-ion capacitor in which the proportion of the first lithium salt is appropriately controlled, since the DCR at low temperature can be reduced by using a positive current collector having an electrostatic capacity of less than or equal to 20 $\mu F/cm^2$, the amount of gas generated at a high temperature is further reduced. Since such a positive current collector has a smooth (that is, plain) surface, it has high strength and can be molded thin, which is also advantageous in increasing the energy density of the lithium-ion capacitor. Even when the positive electrode mixture layer is formed thick, the positive electrode hardly deteriorates, and the positive electrode mixture layer hardly peels off.

A preferable relationship between the proportion of the first lithium salt and the electrostatic capacity of the positive current collector may be expressed as follows. When the proportion of the first lithium salt is X % and the electrostatic capacity of the positive current collector is Y $\mu F/cm^2$, it is desirable that X and Y satisfy Formula (1): $Y \leq X+10$ and Formula (2): $Y \leq -0.8X+28$. where $0<X \leq 35$. That is, it is desirable that the electrostatic capacity Y of the positive current collector satisfies Formula (1) when the proportion of the first lithium salt is in the range of $0<X \leq 10$, and the electrostatic capacity Y of the positive current collector satisfies Formula (2) when the proportion of the first lithium salt is in the range of $10 \leq X \leq 35$. That is, it is desirable that the electrostatic capacity Y of the positive current collector increases along with X in a range where the proportion of the first lithium salt is small, and it is desirable that the electrostatic capacity Y of the positive current collector decreases as X increases in a range where the proportion of the first lithium salt is large. When the electrostatic capacity of the positive current collector and the proportion of the first lithium salt are appropriately controlled, the positive electrode can maintain sufficient durability even when a relatively small amount of a binding agent is used. The content of the binding agent contained in the positive electrode mixture layer may range from 2 mass % to 8 mass %, inclusive, or may range from 2 mass % to 6 mass %, inclusive.

The total molar concentration of the first lithium salt and the second lithium salt in the electrolyte may range from 0.7 mol/L to 1.3 mol/L, inclusive. The concentration of the lithium salt in the electrolyte is measured using the electrolyte in a discharged state (state of charge (SOC) 0% to 10%). When the total molar concentration of the lithium salt is within this range, anions and cations are abundant, and the viscosity of the electrolyte can be maintained considerably low. Thus, it is advantageous for reducing DCR at a low temperature. In addition, in the above range, gas is less likely to be generated during float charging at a high temperature although the electrolyte is rich in anions. This is considered to be because the solvent is hardly decomposed as the ions are coordinated to the solvent.

The electrolyte may contain a third salt other than the first lithium salt or the second lithium salt, but it is desirable that the first lithium salt and the second lithium salt account for more than or equal to 80 mass %, more preferably more than or equal to 90 mass % in the electrolyte.

Examples of the third salt include $LiClO_4$, $LiAlCl_4$, LiSCN, $LiB_{10}Cl_{10}$, LiCl, LiBr, LiI, $LiBCl_4$, $LiCF_3SO_3$, and $LiCF_3CO_2$. These materials may be used alone or in combination of two or more.

Examples of the solvent that may be used include: cyclic carbonates such as ethylene carbonate, propylene carbonate, and butylene carbonate; chain carbonates such as dimethyl carbonate, diethyl carbonate, and ethyl methyl carbonate; aliphatic carboxylate esters such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethyl sulfoxide; 1,3-dioxolane; formamide; acetamide; dimethylformamide; dioxolane; acetonitrile; propionitrile; nitromethane; ethylmonoglyme; trimethoxymethane; sulfolane; methylsulfolane; and 1,3-propane sultone. These materials may be used alone or in combination of two or more kinds thereof.

The electrolyte may contain various additive agents as necessary. For example, an unsaturated carbonate such as vinylene carbonate, vinylethylene carbonate, and divinylethylene carbonate may be added as an additive agent for forming a coating film having lithium ion conductivity on the surface of the negative electrode.

[Negative Electrode]

The negative electrode includes a negative current collector and a negative electrode mixture layer supported on the negative current collector. A sheet-shaped metallic material is used as the negative current collector. The thickness of the negative current collector ranges, for example, from 10 μm to 300 μm, inclusive. The thickness of the negative electrode mixture layer ranges, for example, from 10 μm to 300 μm, inclusive, per surface of the negative current collector.

The negative current collector may be a metal foil, a porous metal body, an etched metal, or the like. As the metallic material, copper, a copper alloy, nickel, stainless steel, or the like may be used.

The negative electrode mixture layer contains a negative electrode active material reversibly doped with lithium ions. The doping of the negative electrode active material with lithium ions is a concept that includes at least an occlusion phenomenon of lithium ions into the negative electrode active material and may include adsorption of lithium ions to the negative electrode active material and chemical interaction between the negative electrode active material and lithium ions.

The negative electrode mixture layer contains a negative electrode active material as an essential component and contains a conductive agent, a binding agent, and the like as optional components. Examples of the conductive agent include carbon black and carbon fiber. Examples of the binding agent include a fluorine resin, an acrylic resin, a rubber material, and a cellulose derivative.

The negative electrode active material is, for example, a carbon material, and contains, for example, non-graphitizable carbon (that is, hard carbon). In the non-graphitizable carbon, the Faraday reaction in which lithium ions are reversibly occluded and released proceeds to develop a capacitance.

The non-graphitizable carbon may have an interplanar spacing d002 (that is, the interplanar spacing between a carbon layer and a carbon layer) of the (002) plane of more than or equal to 3.8 Å as measured by an X-ray diffraction method. The theoretical capacity of the non-graphitizable carbon is desirably, for example, more than or equal to 150 mAh/g. By using non-graphitizable carbon, a negative electrode having a small low-temperature DCR and small expansion and contraction accompanying charging and discharging is likely to be obtained. The non-graphitizable carbon desirably accounts for more than or equal to 50 mass %, further, more than or equal to 80 mass %, and further, more than or equal to 95 mass % of the negative electrode active material. The non-graphitizable carbon desirably accounts for more than or equal to 40 mass %, further, more than or equal to 70 mass %, and further, more than or equal to 90 mass % of the negative electrode mixture layer.

As the negative electrode active material, non-graphitizable carbon and a material other than non-graphitizable carbon may be used in combination. Examples of the material other than non-graphitizable carbon that may be used as the negative electrode active material include graphitizable carbon (soft carbon), graphite (natural graphite, artificial graphite, and the like), lithium titanium oxide (spinel type lithium titanium oxide or the like), silicon oxide, silicon alloys, tin oxide, and tin alloys.

The average particle size of the negative electrode active material (in particular, non-graphitizable carbon) ranges preferably from 1 μm to 20 μm, inclusive, more preferably from 2 μm to 15 μm, inclusive, from the viewpoint of a high filling property of the negative electrode active material in the negative electrode and easy inhibition of side reactions with the electrolyte. The average particle size refers to a median diameter in a volume-based particle size distribution, which may be measured by, for example, a laser diffraction particle size distribution analyzer.

The negative electrode mixture layer is formed, for example, by mixing a negative electrode active material, a conductive agent, a binding agent, and the like together with a dispersion medium to prepare a negative electrode mixture slurry, applying the negative electrode mixture slurry to the negative current collector, and then drying the negative electrode mixture slurry.

The negative electrode mixture layer is pre-doped with lithium ions. This doping decreases the potential of the negative electrode and thus increases a difference in potential (that is, voltage) between the positive electrode and the negative electrode and improves energy density of the lithium-ion capacitor. The amount of lithium to be pre-doped may range, for example, about from 50% to 95% of the maximum amount that can be occluded in the negative electrode mixture layer.

The lithium for pre-doping the negative electrode mixture layer may be attached to the surface of the negative electrode mixture layer by, for example, a gas phase method, transfer, or the like. Examples of the gas phase method include chemical vapor deposition, physical vapor deposition, and sputtering.

Pre-doping of the negative electrode mixture layer with lithium ions further proceeds, for example, by bringing the negative electrode mixture layer and the electrolyte into contact with each other, and is completed by being left for a predetermined time. The pre-doping of the lithium ions to the negative electrode may also be completed by applying a predetermined charge voltage (for example, 3.4 V to 4.0 V)

between the terminals of the positive electrode and the negative electrode for a predetermined time (for example, 1 hour to 75 hours).

(Separator)

As the separator, a nonwoven fabric made of cellulose fiber, a nonwoven fabric made of glass fiber, a microporous film, woven fabric, or nonwoven fabric made of polyolefin, or the like may be used. The thickness of the separator ranges, for example, from 8 μm to 300 μm, inclusive.

Figure 1:
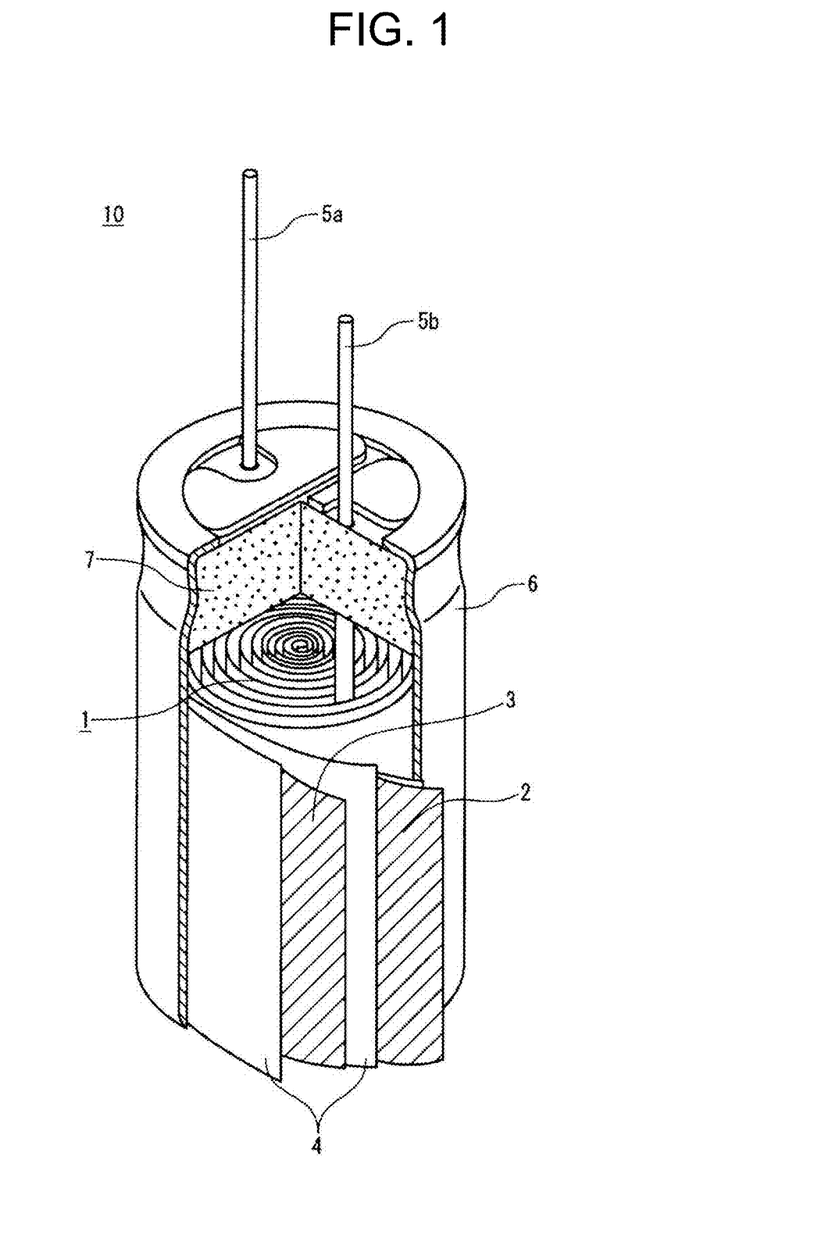
FIG. 1 is a partially cutout perspective view illustrating a lithium-ion capacitor according to an exemplary embodiment of the present disclosure.

FIG. 1 schematically illustrates the configuration of a lithium-ion capacitor according to an exemplary embodiment of the present invention. Lithium-ion capacitor 10 in the illustrated example includes wound capacitor element 1. Capacitor element 1 has a structure in which sheet-like positive electrode 2 and sheet-like negative electrode 3 are wound with separator 4 interposed therebetween. Positive electrode 2 and the negative electrode 3 have a positive current collector and a negative current collector made of metal, and a positive electrode mixture layer and a negative electrode mixture layer supported on the surface of the positive current collector and the negative current collector, respectively, and develop capacitance by doping and dedoping anions or lithium ions. As separator 4, for example, a nonwoven fabric containing cellulose as a main component is used. Positive electrode lead wire 5a and negative electrode lead wire 5b are connected as lead-out members to positive electrode 2 and negative electrode 3, respectively. Capacitor element 1 is housed in cylindrical outer case 6 together with an electrolytic solution (not shown). The material of outer case 6 may be, for example, metal such as aluminum, stainless steel, copper, iron, or brass. The opening of outer case 6 is sealed with sealing member 7. Lead wires 5a and 5b penetrate sealing member 7 and are led out to the outside. For sealing member 7, for example, a rubber material such as butyl rubber is used.

The maximum allowable temperature of the lithium-ion capacitor according to the present disclosure is, for example, more than or equal to 80° C., and may be more than or equal to 85° C. The maximum allowable temperature refers to a maximum ambient temperature at which the capacitor can be continuously used. The maximum allowable temperature is, for example, a maximum ambient temperature at which the manufacturer of the lithium-ion capacitor guarantees to the purchaser that the lithium-ion capacitor can be used, and is described in a catalog, a pamphlet, a product specification, or the like. The maximum allowable temperature may be a numerical value calculated from a relational expression between the nominal temperature coefficient, the electrostatic capacity at 25° C., and the electrostatic capacity at the maximum allowable temperature.

Hereinafter, the present invention will be described in more detail by way of Examples and Comparative Examples, but the present invention is not limited to Examples.

(1) Positive Current Collector

A plurality of types of aluminum foils having different electrostatic capacities were prepared. The electrostatic capacity of the aluminum foil was controlled by changing the surface roughness of the aluminum foils. The thickness of the aluminum foil having the smallest electrostatic capacity was 20 μm, and the surface roughness of the aluminum foil was changed by etching the aluminum foil.

(2) Electrolyte $LiPF_6$ was used as the first lithium salt, and LiFSI was used as the second lithium salt. As a solvent, a mixture of propylene carbonate and dimethyl carbonate at a volume ratio of 1:1 was used. Vinylene carbonate was contained in a content of 0.2 mass % in the solvent. The predetermined lithium salt was dissolved in the solvent at a predetermined concentration to prepare an electrolyte. The total molar concentration of the first lithium salt ($LiPF_6$) and the second lithium salt (LiFSI) in the electrolyte was fixed at 1.2 mol/L. A plurality of electrolytes having different proportions of the molar concentration of the first lithium salt ($LiPF_6$) in the total molar concentration were prepared.

(3) Production of Positive Electrode

Activated carbon (average particle size: 5.5 μm) in content ratios of 88 parts by mass as a positive electrode active material, 2 parts by mass of polytetrafluoroethylene as a binding agent, 4 parts by mass of carboxycellulose as a thickener, and 6 parts by mass of acetylene black as a conductive agent were dispersed in water, whereby a positive electrode mixture slurry was prepared. The obtained positive electrode mixture slurry was applied to both surfaces of the predetermined aluminum foil, the coating film was dried, and the obtained material was rolled to form a positive electrode mixture layer, whereby a positive electrode was obtained. A positive electrode lead wire was connected to the aluminum foil as a lead-out member.

(4) Production of Negative Electrode

Non-graphitizable carbon (average particle size: 5 μm) in content ratios of 97 parts by mass, 2 parts by mass of styrene butadiene rubber as a binding agent, 1 part by mass of carboxycellulose as a thickener, and 6 parts by mass of Ketjen black as a conductive agent were dispersed in water, whereby a negative electrode mixture slurry was prepared. The obtained negative electrode mixture slurry was applied to both surfaces of a copper foil having a thickness of 10 μm, the coating film was dried, and the obtained material was rolled to form a negative electrode mixture layer, whereby a negative electrode was obtained. A negative electrode lead wire was connected to the copper foil as a lead-out member.

Thereafter, a thin film of metal lithium for pre-doping was formed on the entire surface of the negative electrode mixture layer by vacuum vapor deposition. The amount of lithium for pre-doping the negative electrode mixture layer was set such that the negative electrode potential in an electrolyte after the completion of pre-doping was less than or equal to 0.2 V with respect to metal lithium.

(5) Production of Capacitor Element

The negative electrode and the predetermined positive electrode were wound in a columnar shape with a separator (thickness: 25 μm) of a cellulose nonwoven fabric interposed therebetween to form a capacitor element. At this time, each lead wire was protruded from one end surface of the wound body.

(6) Assembly of Lithium-Ion Capacitor

The capacitor element was housed in a bottomed cell case having an opening, a predetermined electrolyte was injected into the cell case, and then the opening of the cell case was closed with a sealing member in such a manner that each lead wire penetrates the sealing member and was led out to the outside, whereby a lithium-ion capacitor as shown in FIG. 1 was assembled.

Thereafter, aging was performed at 60° C. while a charge voltage of 3.8 V was applied between terminals of the positive electrode and the negative electrode to complete pre-doping of the negative electrode with lithium ions.

(7) Evaluation (Measurement of DCR)

The lithium-ion capacitor immediately after aging was subjected to constant current charging at a current density of 2 mA/cm$^2$ per positive electrode area under an environment of −30° C. until the voltage reached 3.8 V, and then a state in which the voltage of 3.8 V was applied was maintained for 10 minutes. Thereafter, under an environment of −30° C., constant current discharging was performed at a current density of 2 mA/cm² per positive electrode area until the voltage reached 2.2 V.

Next, using the discharge curve (vertical axis: discharge voltage, horizontal axis: discharge time) obtained by the above discharging, a first-order approximate straight line in the range of from 0.05 seconds to 0.2 seconds after the start of discharging of the discharge curve was obtained, and voltage VS of an intercept of the approximate straight line was obtained. A value (V0−VS) obtained by subtracting voltage VS from voltage V0 at the start of discharge (when 0 second has elapsed from the start of discharge) was obtained as ΔV. The internal resistance (DCR) (Ω) was determined from the formula shown below using ΔV (V) and a current value (current density per positive electrode area: 2 mA/cm²×positive electrode area) at the time of discharging. In the formula, Id is a current value at the time of discharge (current density per positive electrode area: 2 mA/cm²×positive electrode area).

When the electrostatic capacity of the positive current collector is 4 μF/cm², and the proportion of the molar concentration of the first lithium salt (LiPF$_6$) in the total molar concentration of the first lithium salt (LiPF$_6$) and the second lithium salt (LiFSI) is 0% (that is, when all the lithium salt is LiFSI), the DOR is set as 100, and the relative value is shown in Table 1. The smaller the numerical value, the lower the DCR.

DCR=ΔV/Id (Float Test)

Under an environment of 85° C., float charging was performed in which the lithium-ion capacitor was held for 1000 hours in a state where a constant voltage of 3.8 V was applied to the lithium-ion capacitor, and the amount of gas generated during the float charging was determined. The amount of gas generated during float charging was calculated from the swelling amount of the rubber sealing member. When the electrostatic capacity of the positive current collector is 4 μF/cm², and the proportion of the molar concentration of the first lithium salt (LiPF$_6$) in the total molar concentration of the first lithium salt (LiPF$_6$) and the second lithium salt (LiFSI) is 0% (that is, when all the lithium salt is LiFSI), the gas generation amount is set as 100, and the relative value is shown in Table 2. The smaller the numerical value, the smaller the gas generation amount. When the gas generation amount is small, the side reaction between the positive current collector and the electrolyte is small and the positive electrode is less likely to deteriorate.

TABLE 1

−30° C. DCR

| Electrostatic capacity of Al foil | Proportion of molar concentration of LiPF$_6$ (%) | | | | | |
|---|---|---|---|---|---|---|
| (μF/cm²) | 0 | 10 | 20 | 30 | 40 | 50 |
| 54 | 112 | 107 | 101 | 96 | — | 91 |
| 40 | 110 | 105 | 99 | 95 | — | 89 |
| 30 | 107 | 102 | 98 | 93 | — | 87 |
| 20 | 105 | 98 | 95 | 90 | — | 85 |
| 10 | 101 | 94 | 91 | 87 | — | 82 |
| 4 | 100 | 94 | 90 | 86 | 83 | 81 |

TABLE 2

Gas generation amount

| Electrostatic capacity of Al foil | Proportion of molar concentration of LiPF$_6$ (%) | | | | | |
|---|---|---|---|---|---|---|
| (μF/cm²) | 0 | 10 | 20 | 30 | 40 | 50 |
| 54 | 102 | 142 | 175 | 220 | — | 311 |
| 40 | 102 | — | — | — | — | — |
| 30 | 101 | 123 | 148 | 190 | — | 233 |
| 20 | 100 | 106 | 131 | — | — | — |
| 10 | 100 | 103 | 105 | 130 | — | 171 |
| 4 | 100 | 100 | 102 | 111 | 124 | 149 |

From Tables 1 and 2, it can be understood that well-balanced results are obtained in which deterioration of the positive electrode can be inhibited while DCR at a low temperature is reduced when the electrostatic capacity of the positive current collector is less than or equal to 20 μF/cm², and the proportion of the molar concentration of the first lithium salt in the total molar concentration of the lithium salt in the electrolyte is more than 0% and less than or equal to 35%.

Next, the proportion of the molar concentration of the first lithium salt (LiPF$_6$) in the total molar concentration of the first lithium salt (LiPF$_6$) and the second lithium salt (LiFSI) in the electrolyte was fixed at 10%, and a plurality of types of electrolytes having different total molar concentrations were prepared. Except that the predetermined electrolyte was used, a lithium-ion capacitor was assembled and aged in the same manner as described above to complete pre-doping of lithium ions to the negative electrode.

Figure 2:
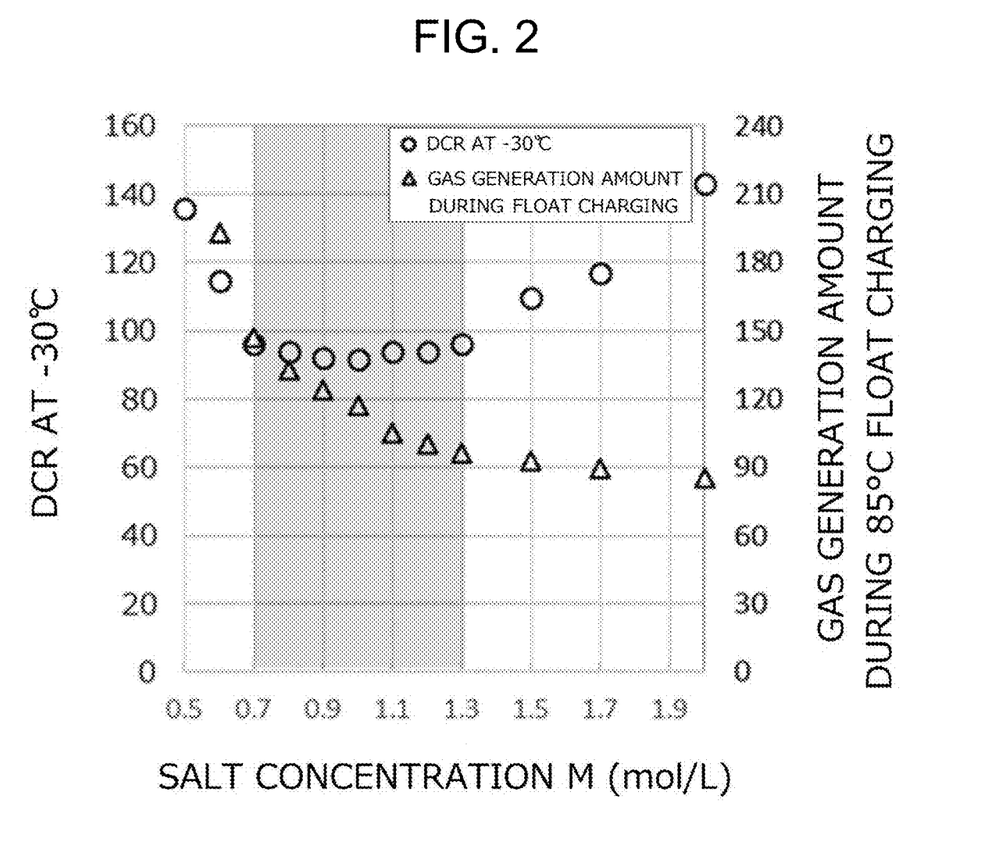
FIG. 2 is a graph showing a relationship between a total molar concentration of a lithium salt and a gas generation amount at float charging at a high temperature and DCR at a low temperature of a lithium-ion capacitor.

FIG. 2 shows the relationship between the total molar concentration of the lithium salt (salt concentration M) and the amount of gas generated during float charging at 85° C., and the DCR at −30° C. of the lithium-ion capacitor. From FIG. 2, it can be understood that the total molar concentration of the lithium salt in the electrolyte ranges desirably from 0.7 mol/L to 1.3 mol/L, inclusive, or from 0.7 mol/L to 1.0 mol/L, inclusive.

The lithium-ion capacitor according to the present invention is suitable for applications in which the maximum allowable temperature is more than or equal to 80° C. or more than or equal to 85° C., and is suitable for in-vehicle applications, for example.

The invention claimed is:

1. A lithium-ion capacitor comprising:
a positive electrode;
a negative electrode; and
an electrolyte having lithium ion conductivity, wherein:
the positive electrode includes a positive current collector and a positive electrode mixture layer supported on the positive current collector,
the positive electrode mixture layer contains a positive electrode active material reversibly doped with an anion,
an electrostatic capacity of the positive current collector is less than or equal to 20 μF/cm²,
the negative electrode includes a negative current collector and a negative electrode mixture layer supported on the negative current collector,
the negative electrode mixture layer contains a negative electrode active material reversibly doped with a lithium ion,
the electrolyte contains a first lithium salt and a second lithium salt, the first lithium salt is a lithium salt of a fluorine-containing inorganic acid, the second lithium salt is a lithium salt of a fluorine-containing acid imide, and a proportion of a molar concentration of the first lithium salt in a total molar concentration of the first lithium salt and the second lithium salt in the electrolyte is more than 0% and less than or equal to 35%.

2. The lithium-ion capacitor according to claim 1, wherein X and Y satisfy formula (1) and formula (2):

$$Y \leq X+10, \quad \text{formula (1)}$$

$$Y \leq -0.8X+28 \quad \text{formula (2)}$$

where X denotes the proportion (%) of the molar concentration of the first lithium salt and Y denotes the electrostatic capacity ($\mu F/cm^2$) of the positive current collector.

3. The lithium-ion capacitor according to claim 1, wherein the electrostatic capacity of the positive current collector is less than or equal to 4 $\mu F/cm^2$.

4. The lithium-ion capacitor according to claim 1, wherein the total molar concentration of the first lithium salt and the second lithium salt in the electrolyte is more than or equal to 0.7 mol/L and less than or equal to 1.3 mol/L.

5. The lithium-ion capacitor according to claim 1, wherein the positive electrode active material includes activated carbon.

6. The lithium-ion capacitor according to claim 1, wherein the first lithium salt is at least one selected from the group consisting of $LiPF_6$, $LiBF_4$, $LiSbF_6$, and $LiAsF_6$, and the second lithium salt is at least one selected from the group consisting of $LiN(FSO_2)_2$, $LiN(CF_3SO_2)_2$, $LiN(CF_3SO_2)(C_4F_9SO_2)$, and $LiN(C_2F_5SO_2)_2$.

7. The lithium-ion capacitor according to claim 1, a maximum allowable temperature of the lithium-ion capacitor is more than or equal to 80° C.

8. The lithium-ion capacitor according to claim 1, a maximum allowable temperature of the lithium-ion capacitor is more than or equal to 85° C.

9. The lithium-ion capacitor according to claim 1, wherein the proportion of the molar concentration of the first lithium salt in a total molar concentration of the first lithium salt and the second lithium salt in the electrolyte is more than 0% and less than 10%.

* * * * *